US007627562B2

(12) United States Patent
Kacmarcik et al.

(10) Patent No.: US 7,627,562 B2
(45) Date of Patent: Dec. 1, 2009

(54) OBFUSCATING DOCUMENT STYLOMETRY

(75) Inventors: Gary J Kacmarcik, Bothell, WA (US); Michael Gamon, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 184 days.

(21) Appl. No.: 11/451,910

(22) Filed: Jun. 13, 2006

(65) Prior Publication Data
US 2007/0288458 A1    Dec. 13, 2007

(51) Int. Cl.
*G06F 17/30* (2006.01)
(52) U.S. Cl. ............................................. 707/3; 707/10
(58) Field of Classification Search ...................... 707/3, 707/10
See application file for complete search history.

(56) References Cited

U.S. PATENT DOCUMENTS

| 6,012,075 | A  | * | 1/2000  | Fein et al.         | 715/256 |
| 6,085,206 | A  | * | 7/2000  | Domini et al.       | 715/257 |
| 6,240,412 | B1 |   | 5/2001  | Dyko et al.         | 707/5   |
| 6,272,495 | B1 |   | 8/2001  | Hetherington        | 707/101 |
| 6,418,410 | B1 | * | 7/2002  | Nassiff et al.      | 704/251 |
| 6,591,300 | B1 |   | 7/2003  | Yurkovic            | 709/226 |
| 6,970,859 | B1 |   | 11/2005 | Brechner et al.     | 707/3   |
| 7,359,851 | B2 | * | 4/2008  | Tong et al.         | 704/8   |
| 2003/0233620 | A1 |   | 12/2003 | Vedullapalli et al. | 715/522 |
| 2004/0064335 | A1 |   | 4/2004  | Yang                | 705/1   |
| 2004/0125148 | A1 |   | 7/2004  | Pea et al.          | 345/802 |
| 2004/0162827 | A1 | * | 8/2004  | Nakano              | 707/6   |
| 2005/0091543 | A1 |   | 4/2005  | Holtzman et al.     | 713/202 |
| 2005/0282563 | A1 |   | 12/2005 | Wardimon            | 455/466 |
| 2007/0239433 | A1 | * | 10/2007 | Chaski              | 704/9   |

FOREIGN PATENT DOCUMENTS

WO    WO 00/49535    8/2000

OTHER PUBLICATIONS

Mary Cook, "Experimenting to Produce a Software Tool for Authorship Attribution," May 7, 2003, pp. i-vi, pp. 1-59.
Jasmine Novak, Prabhakar Raghavan and Andrew Tomkins, Anti-Aliasing on the Web, pp. 30-39, May 2004.
Carole E. Chaski, Ph.D., International Journal of Digital Evidence, vol. 4, Issue 1, "Who's At The Keyboard? Authorship Attribution in Digital Evidence Investigations," Spring 2005, 1-13.
Olivier de Vel, Malcolm Corney, Alison Anderson and George Mohay, "Language and Gender Author Cohort Analysis of E-mail for Computer Forensics," 2002, pp. 1-16.
Ian Avrum Goldberg, "A Pseudonymous Communications Infrastructure for the Internet," Fall 2000, pp. 1-138.

* cited by examiner

*Primary Examiner*—Baoquoc N To
(74) *Attorney, Agent, or Firm*—Westman, Champlin & Kelly, P.A.

(57) ABSTRACT

A new system has been invented that can obfuscate the stylometry of a document. This may be used to anonymize a document and make it resistant to forensic stylometry analysis, or to mimic the style of an existing set of documents, for example. A system may compare indicators of distinctive stylometry in a document with corresponding indicators of distinctive stylometry in a stylometric reference, and provide one or more alterations to the document that alter the indicators of distinctive stylometry compared to the stylometric reference, according to one illustrative embodiment.

16 Claims, 7 Drawing Sheets

OBFUSCATING DOCUMENT STYLOMETRY

BACKGROUND

Stylometry analysis involves analyzing telltale aspects of writing style particularly favored by an individual writer, often without explicit recognition of their own subtle preferences. Stylometry analysis addresses aspects of language such as word usage and grammatical choices, and other information contained in the words of a document, as opposed to handwriting, the analysis of which is a separate discipline. Research has shown that particular writers tend to use writing idiosyncracies consistently over time and between written works, allowing these writing idiosyncracies to serve as clues that may reveal a writing of unknown authorship to match writing samples of a known author, or that, even in the absence of specific bases of comparison, may indicate basic aspects of identity such as native language and gender.

Stylometry analysis has been a valuable tool both for linguistic and literary research, and for providing evidence in investigations and legal disputes. However, there are many situations in which forensic stylometry analysis has the potential to be abused, or when the use of forensic stylometry analysis may impede a compelling interest. This may be the case, for example, with writings that provide legitimate criticism of entities that have the resources to use forensic stylometry analysis, such as critical political essays, or whistleblower letters.

The discussion above is merely provided for general background information and is not intended to be used as an aid in determining the scope of the claimed subject matter.

SUMMARY

A new system has been invented that can obfuscate the stylometry of a document. This may be used to anonymize a document and make it resistant to forensic stylometry analysis, or to mimic the style of an existing set of documents, for example. A system may compare indicators of distinctive stylometry in a document with corresponding indicators of distinctive stylometry in a stylometric reference, and provide one or more alterations to the document that alter the indicators of distinctive stylometry compared to the stylometric reference, according to one illustrative embodiment.

The Summary and Abstract are provided to introduce a selection of concepts in a simplified form that are further described below in the Detailed Description. The Summary and Abstract are not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As noted above, stylometric analysis has been of interest for linguistic and literary studies, among other uses. One well-known example, which is useful for illustrating the concept of stylometric analysis, involves the Federalist Papers, all 85 of which were originally written under the anonymous nom de plume, Publius, but are now known to have been written by James Madison, Alexander Hamilton, and John Jay. Additional well-known examples of widely esteemed writings from approximately the same period of time, that were disseminated under a valuable cover of anonymity, include the articles published under the pseudonyms Brutus, Centinel, Cato, and Federal Farmer, the latter two of which have still not had their true authors definitively established.

While the authorship of most of the Federalist Papers was definitively discovered, there are still twelve of the papers for which no direct evidence has been discovered to establish authorship between either Madison or Hamilton. These persistently anonymous Federalist Papers have been a favorite target for stylometric analysis, which strongly indicates that at least eleven of the twelve remaining Papers were written by Madison.

One particular stylometric technique used to demonstrate this includes measuring the frequency of usage of different words, particularly function words, between Hamilton and Madison in the Federalist Papers of known authorship. One particular example of this is based on the choice between "while" and "whilst", two English function words with the same meaning but with two alternate forms. The Papers known to have been authored by Hamilton include 36 instances of the word "while" and only one instance of the word "whilst", while the Papers known to have been written by Madison include no instances of the word "while", but twelve instances of the word "whilst". The Federalist Papers of unknown authorship include no instances of the word "while", and nine instances of the word "whilst", thereby strongly correlating with the indicators of Madison's distinctive stylometry.

These optional function words persistently used in preference over their alternates constitute a clear example of indicators of distinctive stylometry, in the documents of both authors relative to each other, as well as relative to general usage of the language, as might be represented by a large, diversely sampled stylometric reference. While indicators of distinctive stylometry are not typically as stark as in this particular comparison between Hamilton and Madison, they can generally be found in a more comprehensive stylometric analysis for authors in general.

The examples above demonstrate how valuable writings were produced for which there was a compelling interest in keeping their authorship anonymous at the time. Many other applications with a compelling interest in anonymizing authorship are present today, such as for whistleblowers, investigative journalists or their sources, and political commentators, whose efforts may subject them to unwelcome attention unless they have an effective way to ensure that their writings can remain anonymous, even in the face of modern stylometric analysis. This interest has been recognized by groups such as Journalists Without Borders, which publishes guidelines for journalists and writers to protect their anonymity where needed. Stylometric analysis techniques have also been used to indicate the probable gender or native language of the author, which there may also be a compelling interest in preventing. A wide variety of other applications and implementations also exist, and are not limited to the sample of illustrative implementations described herein.

Figure 1:
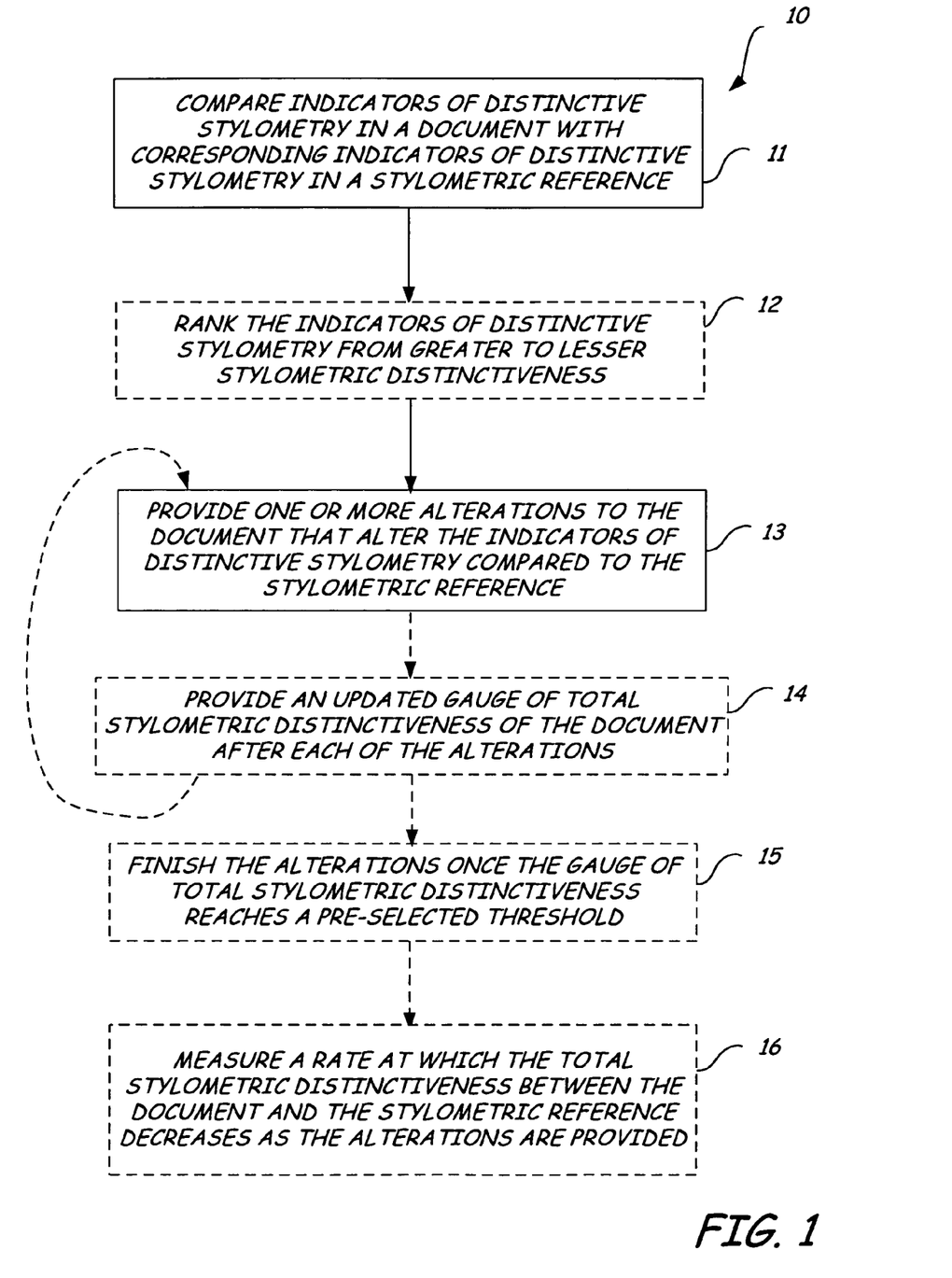
FIG. 1 depicts a flowchart of a method for obfuscating stylometry, according to an illustrative embodiment.

A compelling need therefore exists for implementations for obfuscating indicators of distinctive stylometry. FIG. 1 depicts a flowchart of a method 10 providing an illustrative embodiment of a system for obfuscating stylometry. Method 10 is implementable at least in part by a computing device, such as computing devices 110, 180, 201, 224, and 226 of FIGS. 6 and 7. A language usage classifier could be embodied, for example, as a stand-alone application; as a dynamic-link library (DLL) file that other programs are linked to, so it can be used within the context of other programs; as a web-based application; as an object or a feature within a larger program; or as any of a variety of other possible embodiments.

FIG. 1 includes step 11, of comparing indicators of distinctive stylometry in a document with corresponding indicators of distinctive stylometry in a stylometric reference; and step 13, of providing one or more alterations to the document that alter the indicators of distinctive stylometry compared to the stylometric reference. A variety of additional steps may also be included optionally, as indicated by dashed outlines, in different embodiments, and that are described further below.

Figure 2:
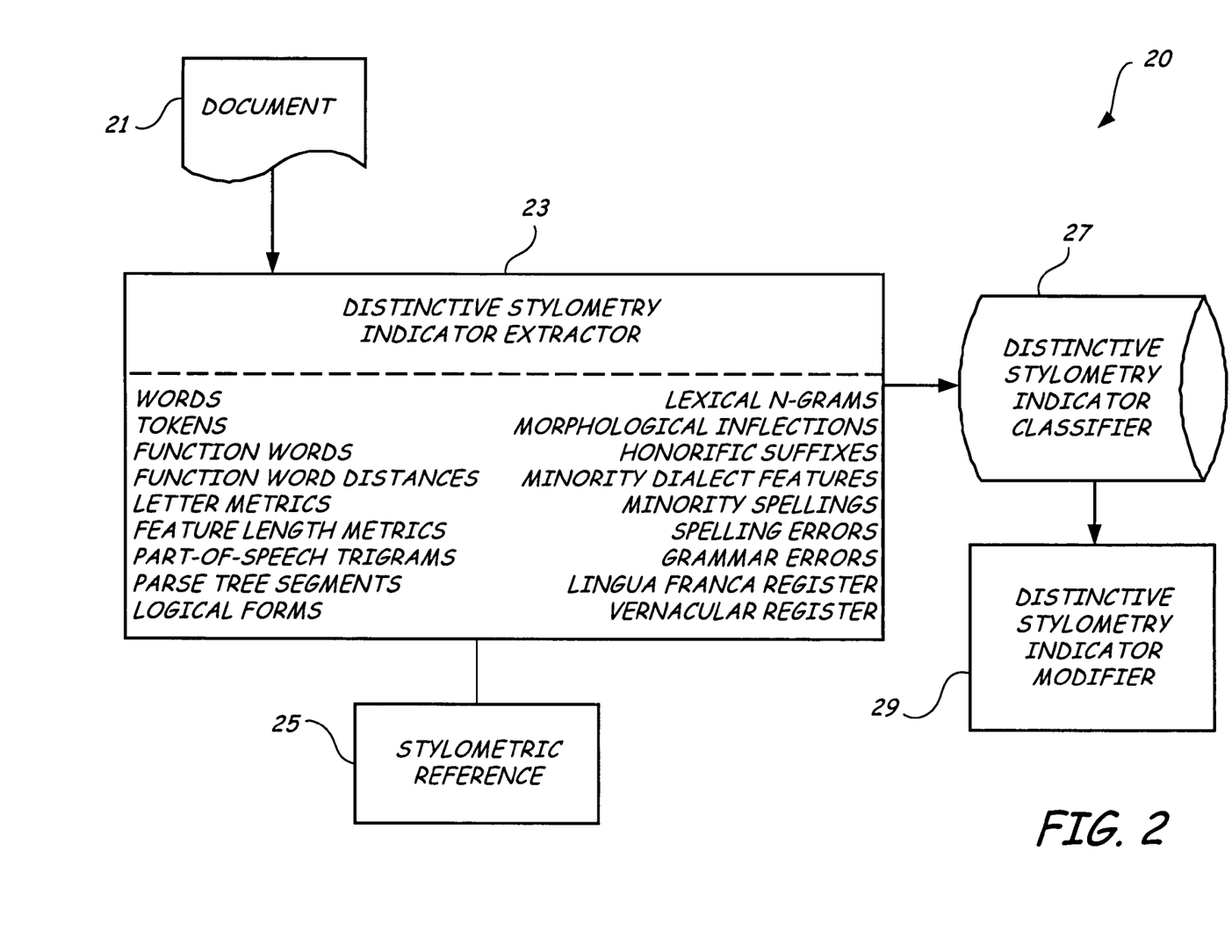
FIG. 2 depicts a block diagram of an architecture for obfuscating stylometry, according to an illustrative embodiment.

FIG. 2 depicts a block diagram of an architecture 20 corresponding in some respects to method 10, according to an illustrative embodiment. Architecture 20 may be implemented by a computing device, as described further below. Architecture 20 includes document 21, distinctive stylometry indicator extractor 23, stylometric reference 25, distinctive stylometry indicator classifier 27, and distinctive stylometry indicator modifier 29.

Distinctive stylometry indicator extractor 23, or extractor 23 for short, extracts or measures a wide variety of indicators of distinctive stylometry, in both stylometric reference 25 and document 21. Some illustrative examples of the indicators of distinctive stylometry extracted or measured by extractor 23 are depicted in FIG. 2, and are described further below. Extractor 23 may measure a variety of reference stylometry indicators from stylometric reference 25 to train classifier 27, in advance of measuring indicators in document 21. Extractor 23 refers to stylometry indicators measured from stylometric reference 25 that correspond to indicators of reference stylometry in stylometric reference 25, in partial performance of step 11 of method 10 in FIG. 1.

Step 11 is finished by distinctive stylometry indicator classifier 27, or classifier 27 for short, in the illustrative embodiment of architecture 20 in FIG. 2. Classifier 27 compares the indicators of distinctive stylometry in document 21 to the corresponding indicators of reference stylometry from stylometric reference 25, as in step 11 of method 10 in FIG. 1.

The extracted features are stored and compiled as the basis for classifier 27, which incorporates a model of the stylometric indicators from the stylometric reference 25, in an illustrative embodiment. Any new indicators of stylometry from document 21 that are measured to be similar to the corresponding stylometric indicators of classifier 27 are classified as "in-class", or within the class modeled for that linguistic feature type by classifier 27, in this illustrative embodiment. A document whose features are mostly indicated to be "in-class" are therefore classified with a low total stylometric distinctiveness. Indicators of stylometry from document 21 that do not fit the learned model of classifier 27 for the corresponding indicators of stylometry are classified as "out-of-class", or, in this case, as having indicators of distinctive stylometry compared with stylometric reference 25. A document with many stylometric indicators that are classified as out-of-class are gauged with a high stylometric distinctiveness.

In one particular implementation provided as an illustrative example, classifier 27 is based on a support vector machine (SVM), and has the reference stylometric indicators stored as feature vectors. An SVM is an automated learning system based on statistical learning theory. In the present illustrative embodiment, the SVM uses a kernel function to model the stylometric indicators of the stylometric reference 25, as measured by extractor 23. A linear basis kernel function is one particular option that may be used in the present embodiment, though any of a variety of other kernel functions may also be used. Classifier 27 may be used as a one-class classifier, or a multi-class classifier. A wide variety of other implementations for classifier 27 may be used in other embodiments.

Distinctive stylometry indicator modifier 29, or modifier 29 for short, provides one or more alterations to the document that alter the indicators of distinctive stylometry compared to the stylometric reference, according to one illustrative implementation of step 13.

Method 10 enables a user to remove indicators of distinctive stylometry from a document, and normalize the stylometry of the document compared to a stylometric reference. The stylometric reference could be a large, anonymized corpus, representing a statistically significant sampling of well-written documents from a large number of writers, for example. A number of popular corpora are in use. One illustrative example which has been in use for some time is the Wall Street Journal corpus, which collects a large number of articles from the Wall Street Journal from over a significant period of time, with a total of approximately a million words.

With such a large corpus providing a substantial cross-section of writers, as in the foregoing illustrative example, the indicators of stylometry may be expected to be smoothed out and anonymized, so that no particular individual author's style is represented in such a sample, and its indicators of stylometry are not significantly distinctive. Altering indicators of distinctive stylometry in the document 21 is therefore effective for reducing the distinctiveness of the indicators for the document 21 compared to the stylometric reference 25, thereby increasing the anonymity of the document 21, as altered by modifier 29. Method 10 can thereby anonymize the stylometric indicators of a document 21, and render the document 21 more resistant to identification of its author by means of stylometric analysis.

The illustrative implementation above focuses on anonymization, by mimicking stylometric indicators in an anonymized stylometric reference, such as a corpus of general language usage. Other implementations may also be used for altering the indicators of distinctive stylometry, which may involve mimicking stylometric indicators in a different stylometric reference, such as one drawn from the writings of a single target author or other narrow sample group.

For example, this could be used for a book or series of books written partially by one or more co-authors or ghost-writers, or for speeches written on someone else's behalf by a speechwriter or a revolving team of speechwriters. Such collaborative writing efforts are likely to have distracting stylistic inconsistencies. These can be resolved by using a stylometric reference of writings by the lead author as the basis of comparison for the contributions of the supporting writers.

The documents written by the supporting writers have their stylometric indicators compared with the corresponding stylometric indicators in the stylometric reference of the lead author's writings, and the stylometric indicators found to be distinctive in the supporting writers' contributions are altered to remove their distinctiveness from the stylometric reference, yielding a stylistic consistency throughout the joint writing of the lead author and supporting authors.

Returning to method 10 in FIG. 1, step 12 includes ranking one or more of the indicators of distinctive stylometry. The alterations to the document are then provided in order from an indicator having the highest ranked stylometric distinctiveness, and progressing through indicators having the successively next highest ranked stylometric distinctiveness. For example, to refer once again to the example of the Federalist Papers, the distinctiveness between the usage of "while" and "whilst" between Hamilton and Madison was particularly pronounced, and is likely to be ranked as having among the highest stylometric distinctiveness between the two authors.

Ranking the indicators of distinctive stylometry and then altering them in order from most distinctive on down provides considerable advantages, according to this illustrative embodiment. The alterations may be performed either automatically, or manually, where one or more suggested alterations for each of the indicators of distinctive stylometry are provided, for the user to consider one at a time. Manual alterations may enable more stylistic consistency, avoid any potential linguistic quirks due to the alterations, and enable greater attention to other considerations of writing quality. However, manual alterations have the trade-off of requiring much more time and attention. An automated routine of alterations performed by a computing device may be finished before the user has an opportunity to consider a single alteration. The greater time and attention required for manual alterations are largely resolved by the advantages of progressing through the alterations according to a ranked order.

Tests have shown that altering the indicators of distinctive stylometry according to a ranked order enable the total stylometric distinctiveness between a document and a stylometric reference to be reduced roughly exponentially, so that a relatively small number of alterations suffices to eliminate most of the stylometric distinctiveness, when the indicators of distinctive stylometry are evaluated starting from the most distinctive and working down through the highest remaining distinctiveness at each iteration.

Working downward from the highest ranked indicators of distinctive stylometry therefore enables a great majority of the alteration of distinctive stylometry to be accomplished by altering only a relatively small fraction of the possible indicators of distinctive stylometry. To cite one particular test implementation as an illustrative example, it was found that altering only fourteen words for each thousand words in the document was sufficient to remove 83% of the likelihood of the author of the document being identifiable in comparison with an anonymized stylometric reference.

Returning again to method 10 in FIG. 1, step 14 includes providing an updated gauge of total stylometric distinctiveness of the document after each of the alterations. In this implementation, the options selectable by the user at each of the indicators of distinctive stylometry include an option to finish altering the indicators of distinctive stylometry in the document, as in step 15, which the user may do with the confidence of having the running gauge of total remaining distinctiveness to consult. The user may have a target distinctiveness in mind, such as only 15%, 10%, or 5%, for example, compared with the stylometric reference.

A small total stylometric distinctiveness such as in this range, combined with the limited sample size of a typical document, is likely to achieve an effective homogenization of the document with the stylometric reference, and make the authorship of the document impossible to distinguish compared with the stylometric reference with any confidence. The user can proceed with the alterations until the gauge shows, after one of the alterations, that the total remaining stylistic distinctiveness is less than the target level, indicating that the indicators of distinctive stylometry have been smoothed over enough to make the document sufficiently resistant to stylometric analysis.

Finishing the alterations once the total stylometric distinctiveness reaches a pre-selected threshold, as in step 15, may also be done when the alterations are run automatically. This may be particularly useful for large documents, for which analysis and replacement of all identifiable indicators of stylometric distinctiveness may require more than the desired amount of time or resources, or likelihood of introducing quirks in the flow of the language.

Returning again to FIG. 2, extractor 23, in different embodiments, may target any linguistic feature with the potential to serve as indicators of stylometric distinctiveness of one author compared to a stylometric reference. A representative sampling of such features for an illustrative embodiment is depicted in association with extractor 23 in FIG. 2. In this illustrative embodiment, extractor 23 measures values of selected features in the document 21, and compares the values of the selected features with values of the selected features in the stylometric reference 25. This may include determining whether each of the selected features is more or less frequent in the document 21 than in the stylometric reference 25, and determining by what percentage each of the selected features is more or less frequent in the document 21 than in the stylometric reference 25, as one illustrative example.

Extractor 23 may also consider several different potential linguistic features to discover which ones perform most effectively in measuring distinctive stylometry between a document and a stylometric reference in a particular application, and proceed with those most effective features. The features associated with extractor 23 all possess in common the property of being linguistic features that are capable of acting as indicators of a particular author's distinctive stylometry.

One of the more powerful features to measure to gauge stylometric distinctiveness is also one of the simplest: the frequency of individual words. Different embodiments may be implemented in any human languages, and in some languages with a logographic script, such as Chinese, or a mixed logographic and syllabic script, such as Japanese, a segmenter may be applied first to segment the characters into words. Words may also be converted into tokens prior to the comparison between the document and the reference. Function words are a traditional favorite feature for stylometric analysis, so altering the function words of a document 21 into consistency with the reference 25, or the function word distances, may be a particularly efficient way to anonymize document 21 in some implementations.

Additional features that can be measured by extractor 23 to evaluate as indicators of distinctive stylometry include letter metrics, feature length metrics, part-of-speech trigrams, parse tree segments, logical forms, lexical N-gram features, morphological inflections, honorific suffixes, minority dialect features, minority spellings, spelling errors, and grammar errors. These features, along with the last few listed, i.e. the lingua franca register and the vernacular register, are explained further below.

Tokenizing or morphological analysis, such as measuring frequencies of morphological inflections, are particularly effective for measuring stylometry of highly inflected languages, such as Lithuanian, Hungarian, and Malayalam.

Other features may be particularly effective for measuring stylometry in specific languages, such as honorific suffixes for Japanese.

Part-of-speech trigrams are another linguistic feature that may be measured by extractor 23 and used by classifier 27 to compare as stylometric indicators between document 21 and stylometric reference 25. Part-of-speech trigrams are sequences of three part-of-speech labels. Part-of-speech labels are often tagged to words in a sample as an early stage of natural language processing. As an example, the phrase "winter is cold" may be part-of-speech tagged as "winter/n is/v cold/a", where "/n" represents a tag indicating a noun part-of-speech, "/v" represents a tag indicating a verb part-of-speech, and "/a" represents a tag indicating an adjective part-of-speech. The part-of-speech trigram for the phrase above is therefore n-v-a.

Another type of measurable indicator in some embodiments, depicted in extractor 23, is a parse tree segment. A parser may be used to convert a sentence into a parse tree representation. For each node in a parse tree, the label for the node and the labels of the daughter nodes of that node may be extracted. For example, a parse tree may include a node with a label of DECL, indicating a declarative sentence, and with daughter nodes labeled with the chunk types NP VERB NP, indicating that the declarative sentence consists of a noun phrase, a verb, and a second noun phrase. These labels may be added to a sentence from a corpus after the corpus has been chunked and parsed, in the present illustrative embodiment. For example, in one illustrative parsing scheme, an original sentence from a training corpus may read, "The microwave anisotropy probe has measured the age of the Universe." This sentence may be chunked as "[NP The microwave anisotropy probe] [VERB has measured] [NP the age of the Universe]", where "The microwave anisotropy probe" has been chunked as an NP, or noun phrase; "has measured" has been chunked as a VERB; and "the age of the Universe" has been chunked as another NP, or noun phrase.

Another measurable type of feature in some embodiments, as indicated in extractor 23, includes features based on the logical form graphs of the sentences. These logical form graphs may include, for example, semantic relations of parts of speech; semantic features on a part of speech in a semantic relation; or the presence of a semantic feature. To use one illustrative semantic relation labeling scheme, one illustrative example of a semantic relation of parts of speech is the logical form graph "Verb Tsub Noun", indicating that a noun is in the semantic subject relation to a verb. As with other extractable features, relative similarities and differences between stylometric indicators of document 21 compared with those of stylometric reference 25 can serve as indicators distinctive stylometry. While a particular labeling scheme is referred to here, any other consistent labeling scheme for semantic relations and logical form graphs may be used in other embodiments.

Still another measurable type of feature in some embodiments, as indicated in extractor 23, includes lexical N-gram features, where N may have a range of different numbers within the same embodiment, and different embodiments having different ranges of N. For example, in one illustrative embodiment, lexical N-gram features are extracted with N ranging from 1 to 3. An example might be a three-word sequence, such as " . . . rearranging the deckchairs . . . " extracted from within a sentence. Any consistent labeling scheme may be used in different embodiments to represent lexical N-gram features in sentences such as this. To use one illustrative labeling scheme, this three-word sequence may be extracted and stored as a lexical trigram—that is, a lexical N-gram with N=3—as "ng_3_rearranging$$the$$deckchairs", where "ng" indicates a lexical N-gram, "3" indicates the numeral of N for this lexical N-gram, and "$$" stands for each space between adjacent words. A variety of different characteristic lexical N-grams may be measured in document 21 that are rarely or never measured in stylometric reference 25, and vice versa, so that lexical N-gram features may also be used as indicators of distinctive stylometry.

Yet another measurable type of feature in some embodiments, as indicated in feature extractor component 421, are function word distances. Function words, as opposed to lexical words, carry little semantic information, and are used chiefly to grammatically modify the usage of lexical words. Functional words may therefore serve as significant indicators of distinctive stylometry, since particular function words are not needed to convey particular meanings, and are therefore more likely to be favored or disfavored in usage as a matter of personal stylometry. Function words include determiners, such as "the" and "a"; conjunctions, such as "and" and "but"; degree adverbs, such as "also" and "very"; and auxiliaries, such as "would" and "should". Distances between functions words is also less dependent on the meaning one intends to convey and more on somewhat arbitrary personal stylometry.

As extractor 23 depicts, spelling errors and grammar errors may also be used for modeling classifier 27 and for indicating distinctive stylometry. Spelling and grammar errors are often not merely typographical errors, but are regularly expressed errors a particular user is liable to make repeatedly. Existing and hereafter developed spelling checkers and grammar checkers, such as those often incorporated in word processing applications, may interface compatibly with extractor 23, to detect and provide spelling and grammar errors for use in modeling classifier 27.

Another interesting and effective characteristic that may reliably serve as a characteristic signature on a particular individual's writing style is the frequency of vocabulary originating from a lingua franca register compared with a frequency of vocabulary originating from a vernacular register. A vernacular register typically comprises that portion of a language that stems from an older or the oldest parent language of the language, and carries function words and basic words for body parts, common plants and animals, common types of food, the basic colors, and other basic vocabulary; and most of all, place names, if the speakers still reside in an ancestral homeland. In contrast, a lingua franca register derives from a language that has only entered the influence of the subject language in relatively recent history, often from contact with a culture with a longer literary and scholarly history than the original parent language from which the vernacular derives.

For example, the English language is derived from an array of several registers, including a vernacular Anglo-Saxon register deriving from a variety of Anglo-Saxon dialects in use in the seven kingdoms during roughly the sixth through eighth centuries, and from the Old Norse spoken by the Norwegian invaders who began settling in the time of Alfred the Great; and the lingua franca registers deriving from the Norman French and scholarly Latin and Greek that William brought to the island in 1066.

Modern English continues to differentiate these registers sharply. Anglo-Saxon words are spoken and written more for things you do and see every day, and are sometimes thought to carry more of a gut feeling for the meaning of the words. In considerable contrast to that vernacular register, the lingua franca or scholarly register of vocabulary derived from French, Latin and Greek dominates formal usage and remains favored for professional utilization, technical communication, and scientific, literary, and educational concepts.

Differentiation between a vernacular register and a lingua franca register is fairly common in other languages, in which they are equally applicable for comparing to measure indicators of distinctive stylometry. For example, Greek, Latin, and French have long supplied lingua franca registers to many other European languages; Avestan, Persian, Sanskrit, and Prakrit have provided lingua franca registers for a variety of central and south Asian and Middle Eastern languages; Persian served as a lingua franca register to Arabic and Turkish, which have in turn become sources of lingua franca registers for surrounding languages; Mandarin Chinese has long served as a lingua franca to other Chinese and many other east Asian languages; Arabic, Swahili, various Bantu languages, French, and English have long provided lingua franca registers to various African languages; and English now provides a lingua franca register to languages all over the world.

An individual author's writing stylometry often bears a highly distinctive stamp based on how much they use baseline vernacular register vocabulary compared with lingua franca or scholarly register vocabulary, a relative frequency that is strongly dependent on inherent factors such as social background, educational level, subject matter, and experience as a writer. Measuring frequency of vocabulary from a vernacular register compared with frequency of vocabulary from a lingua franca register is therefore particularly useful for measuring indicators of distinctive stylometry compared with a stylometric reference.

Turning again to FIG. 1, step 16 depicts an extra layer of anonymization or obfuscation that can be incorporated into alterations to a document. Step 16 includes removing the indicators of distinctive stylometry that have been subject to the alterations from the document, along with the corresponding indicators of stylometry from the stylometric reference, in order of the ranking, from highest distinctiveness to lower distinctiveness; and measuring a rate at which a total stylometric distinctiveness of the document compared to the stylometric reference changes, as the indicators are removed.

This provides a way of testing how well the prior alterations obfuscated the document compared to the stylometric reference. If the total stylometric distinctiveness changes quickly, this indicates that the alterations performed thus far have been relatively concentrated among a few common indicators of distinctive stylometry, but have not deeply saturated the altered document. Performing the deep obfuscation test of step 16 allows the user, either manually or by an automated process, to recursively gauge the depth of the alterations to the indicators of distinctive stylometry, and steer the alterations toward having only a slow change in total stylometric distinctiveness, which indicates a thorough alteration of the indicators of distinctive stylometry in the document.

Figure 3:
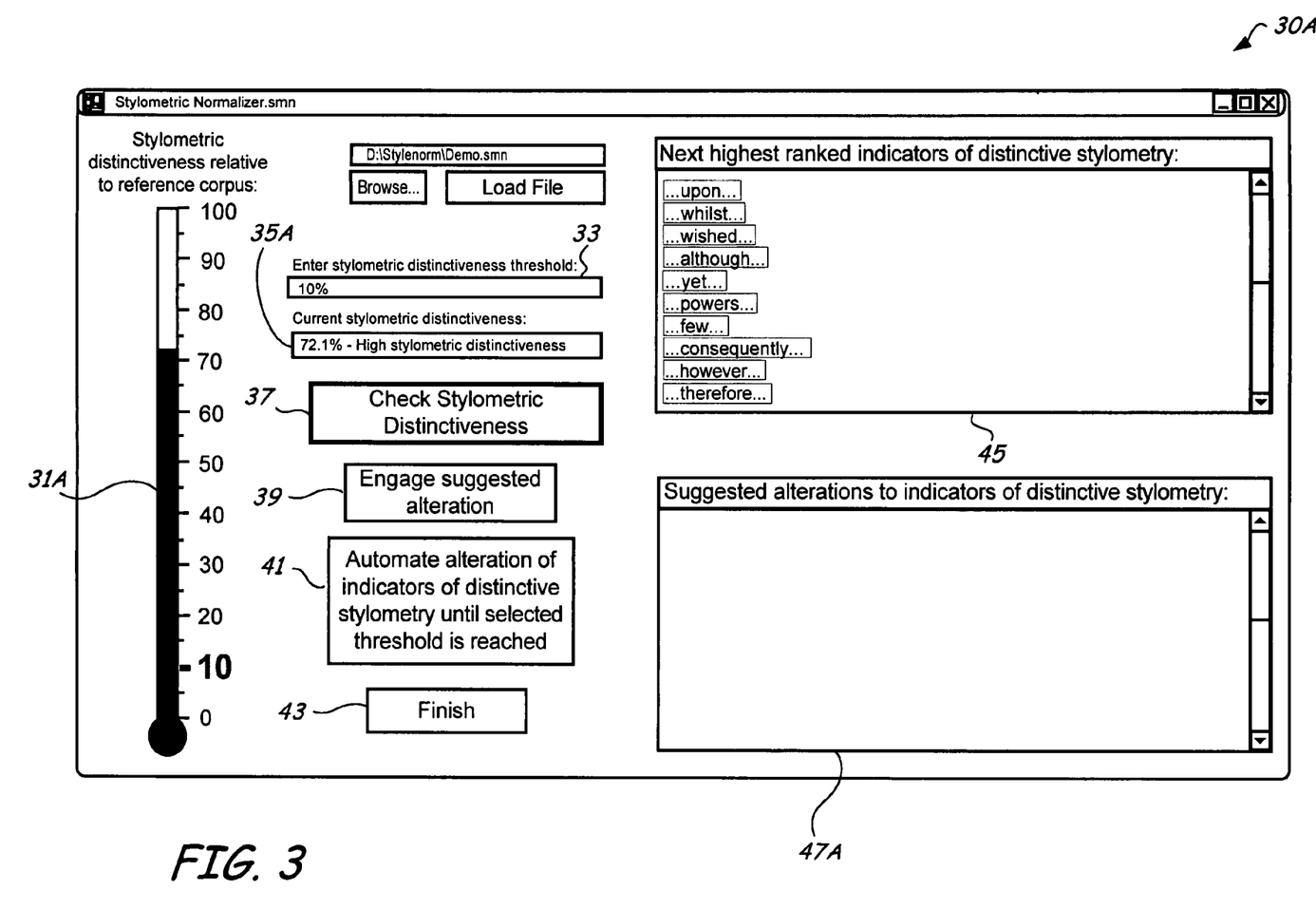
FIG. 3 depicts a user interface for an application for obfuscating stylometry, according to one illustrative embodiment.
Figure 4:
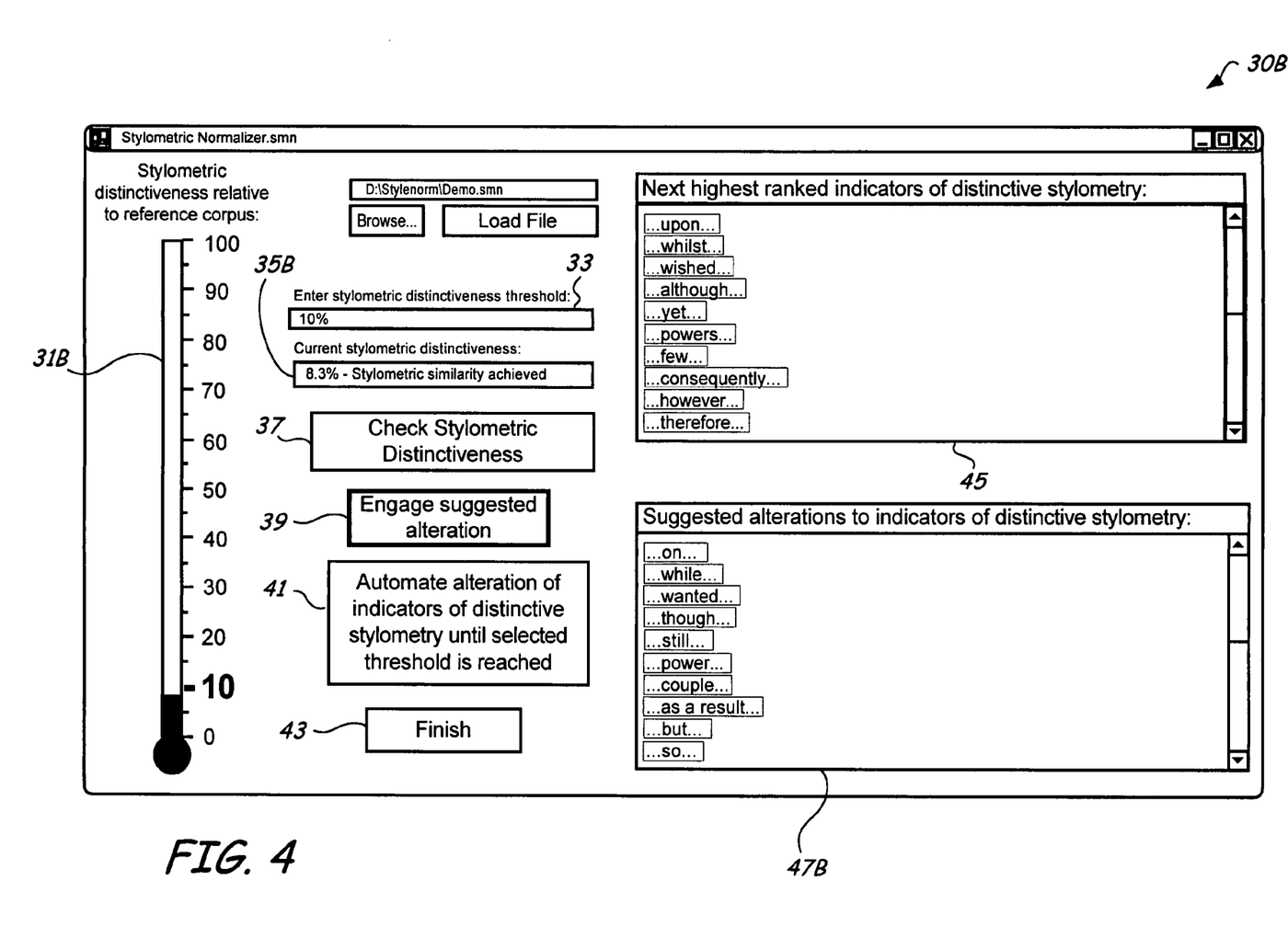
FIG. 4 depicts a user interface for an application for obfuscating stylometry, according to one illustrative embodiment.

FIG. 3 depicts a user application interface 30A for an application for comparing and altering indicators of distinctive stylometry with respect to a reference. FIG. 4 depicts the user application interface 30B in a slightly different configuration, after a few actions have been performed, according to the same illustrative embodiment. Interface 30A includes a gauge 31A that graphically depicts the total stylometric distinctiveness of a document targeted by the application. Field 33 shows a stylometric distinctiveness threshold of 10% that the user has entered. Field 35A shows the current stylometric distinctiveness according to a numerical measure, also reflected graphically in gauge 31A, at 72.1%, constituting a high stylometric distinctiveness, prior to any alterations being performed on the document.

Control field 37 can be clicked or otherwise selected by the user to check stylometric distinctiveness, including by comparing indicators of distinctive stylometry in the document with a corresponding stylometric reference, and provide alterations to the indicators of distinctive stylometry of the document to make them more or less distinctive compared to the stylometric reference. Control field 39 can be selected during a manual alteration process, for engaging the suggested alteration and proceeding to the next most distinctive stylometric indicator. Control field 41 can be selected to automate the alteration of indicators of distinctive stylometry until the selected threshold, as shown in field 33, is reached. Control field 43 can be selected to manually finish the comparison and alteration process.

Field 45 shows the next highest ranked indicators of distinctive stylometry in the target document, in a ranked order from most distinctive down toward less distinctive. Field 47A is configured to display suggested alterations (in a manual process) to indicators of distinctive stylometry, though the control to provide these has not yet been implemented. Control field 37 is depicted in bold line weight to indicate that it has been selected by the user, prompting the display of the stylometric distinctiveness of the target document in gauge 31A and field 35A.

FIG. 4 depicts user application interface 30B, which corresponds to user application interface 30A of FIG. 3, after the field 39 has been repeatedly selected, to engage the suggested alterations of a series of indicators of distinctive stylometry. Those alterations are depicted in field 47B, and constitute the stylometrically less distinctive alterations to the indicators of distinctive stylometry in field 45. Field 35B now shows the stylometric distinctiveness of the target document compared to the stylometric reference at 8.3%, a value also graphically depicted on gauge 31B, representing a fulfillment of the preselected stylometric distinctiveness threshold appearing in field 33. Other implementations are not limited to the particular details of this illustrative example, which shows one representative implementation for a user application to perform method 10 of FIG. 1.

Figure 5:
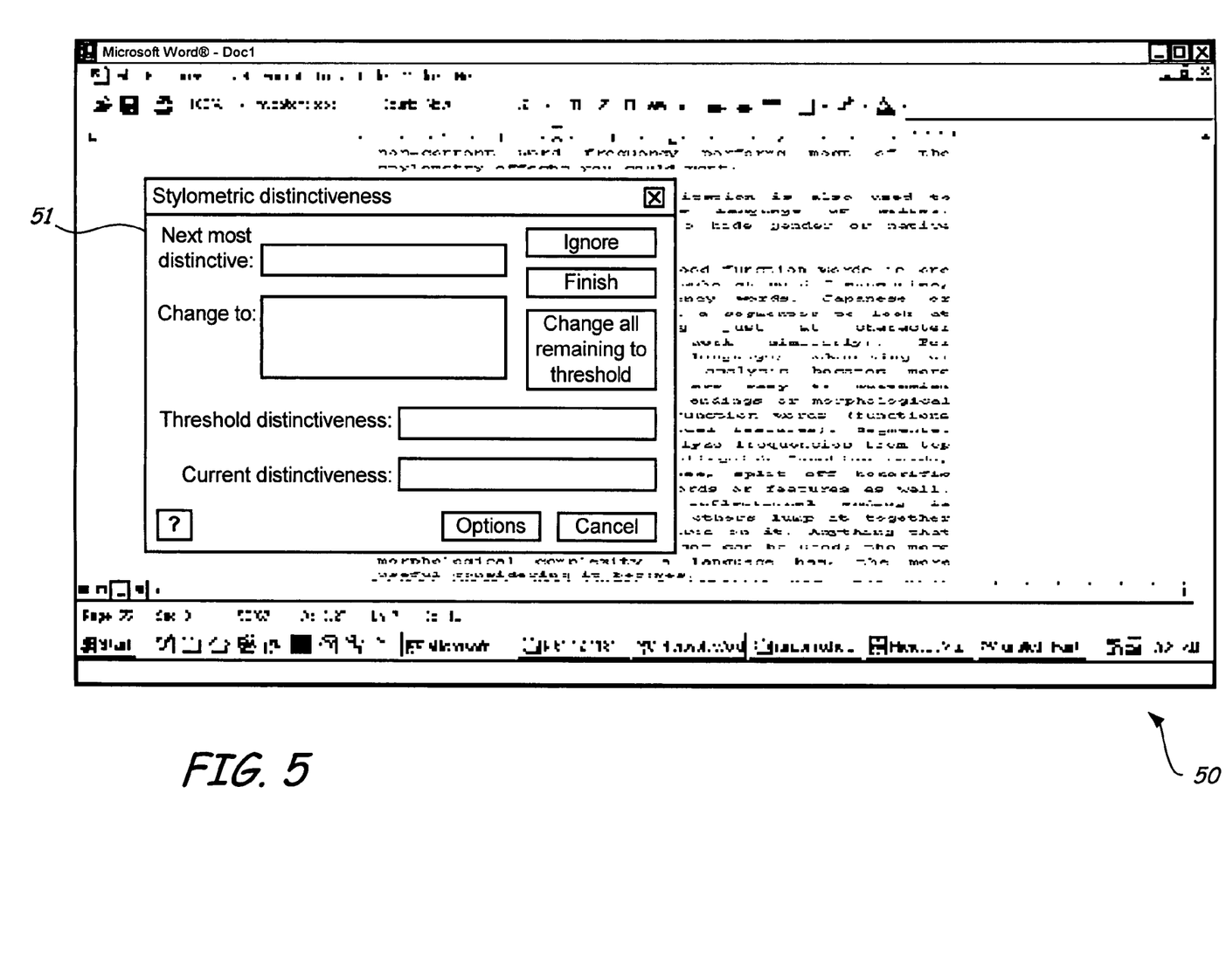
FIG. 5 depicts a user interface for an application for obfuscating stylometry, according to one illustrative embodiment.

FIG. 5 depicts the interface of an application with a distinctive stylometry obfuscator 51 seamlessly integrated into a word processing program with user interface 50, so that a user of the word processing program can measure and provide alterations to indicators of distinctive stylometry without having to open a separate application. Instead, the user can simply select an option in the word processing program which brings up a panel interface for the distinctive stylometry obfuscator 51 and use it on a document that is opened in the word processing application. Analogous implementations could provide the seamlessly integrated panel for the distinctive stylometry obfuscator 51 as a selectable option in other applications, such as a web browser, a spreadsheet application, or a presentations application, as a few other illustrative implementations, though it is not limited to these examples, and could be implemented in any applicable environment or context.

Figure 6:
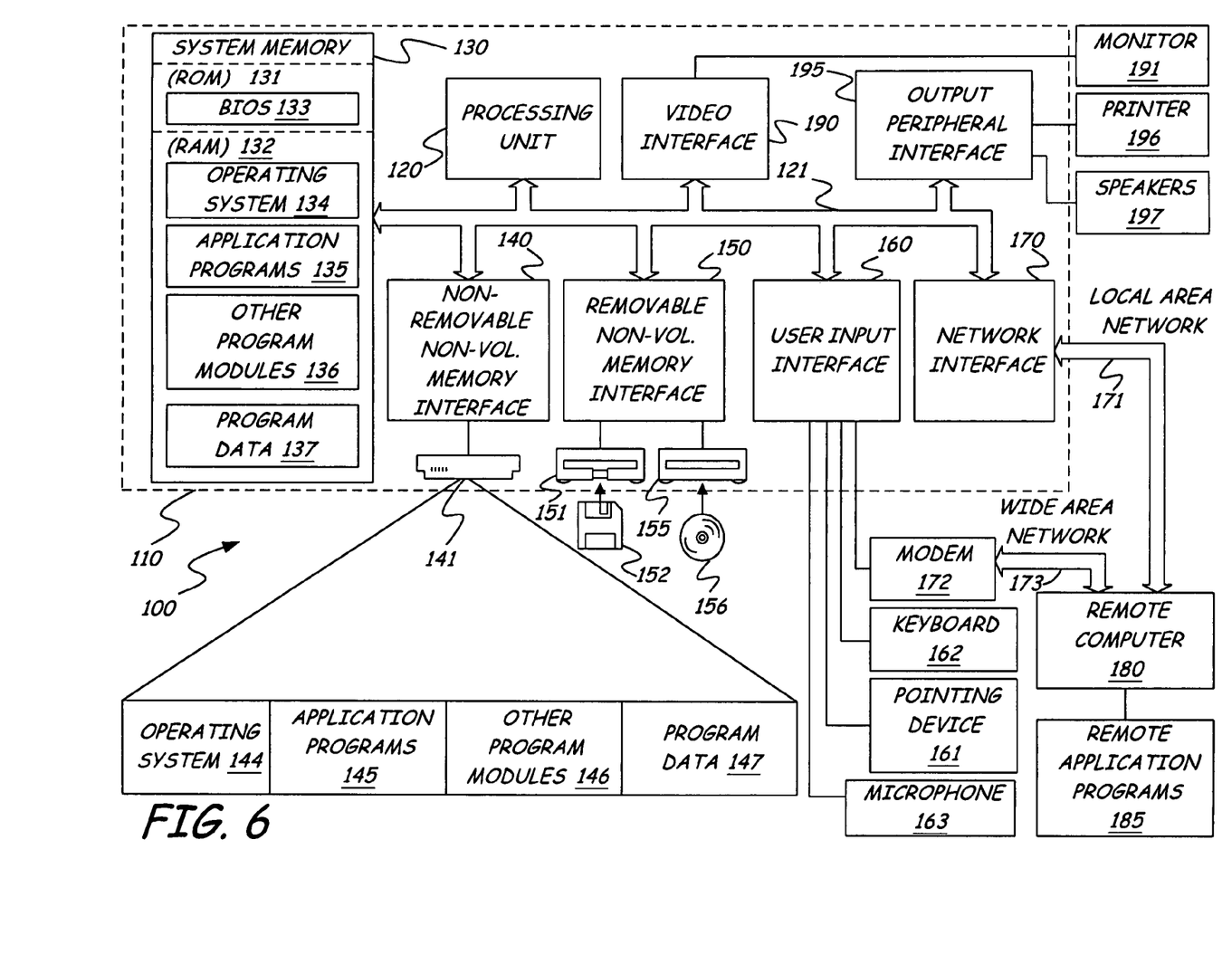
FIG. 6 depicts a block diagram of a general computing environment, according to one illustrative embodiment.

A few illustrative systems and environments with which various implementations for obfuscating document stylometry are further described as follows. FIG. 6 depicts a block diagram of a general computing environment 100, comprising a computer 110 and various media such as system memory 130, nonvolatile magnetic disk 152, nonvolatile optical disk 156, and a medium of remote computer 180 hosting remote application programs 185, the various media being readable by the computer and comprising executable instructions that are executable by the computer, according to an illustrative embodiment. FIG. 6 illustrates an example of a suitable computing system environment 100 on which various embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Various embodiments may be implemented as instructions that are executable by a computing device, which can be embodied on any form of computer readable media discussed below. Various additional embodiments may be implemented as data structures or databases that may be accessed by various computing devices, and that may influence the function of such computing devices. Some embodiments are designed to be practiced in distributed computing environments where tasks are performed by remote processing devices that are linked through a communications network. In a distributed computing environment, program modules may be located in both local and remote computer storage media including memory storage devices.

With reference to FIG. 6, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

The computer 110 may also include other removable/non-removable volatile/nonvolatile computer storage media. By way of example only, FIG. 6 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 6, provide storage of computer readable instructions, data structures, program modules and other data for the computer 110. In FIG. 6, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may be operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 6 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 6 illustrates remote application programs 185 as residing on remote computer 180. It will be appreciated that the network connections shown are exemplary and other means of establishing a communications link between the computers may be used.

Figure 7:
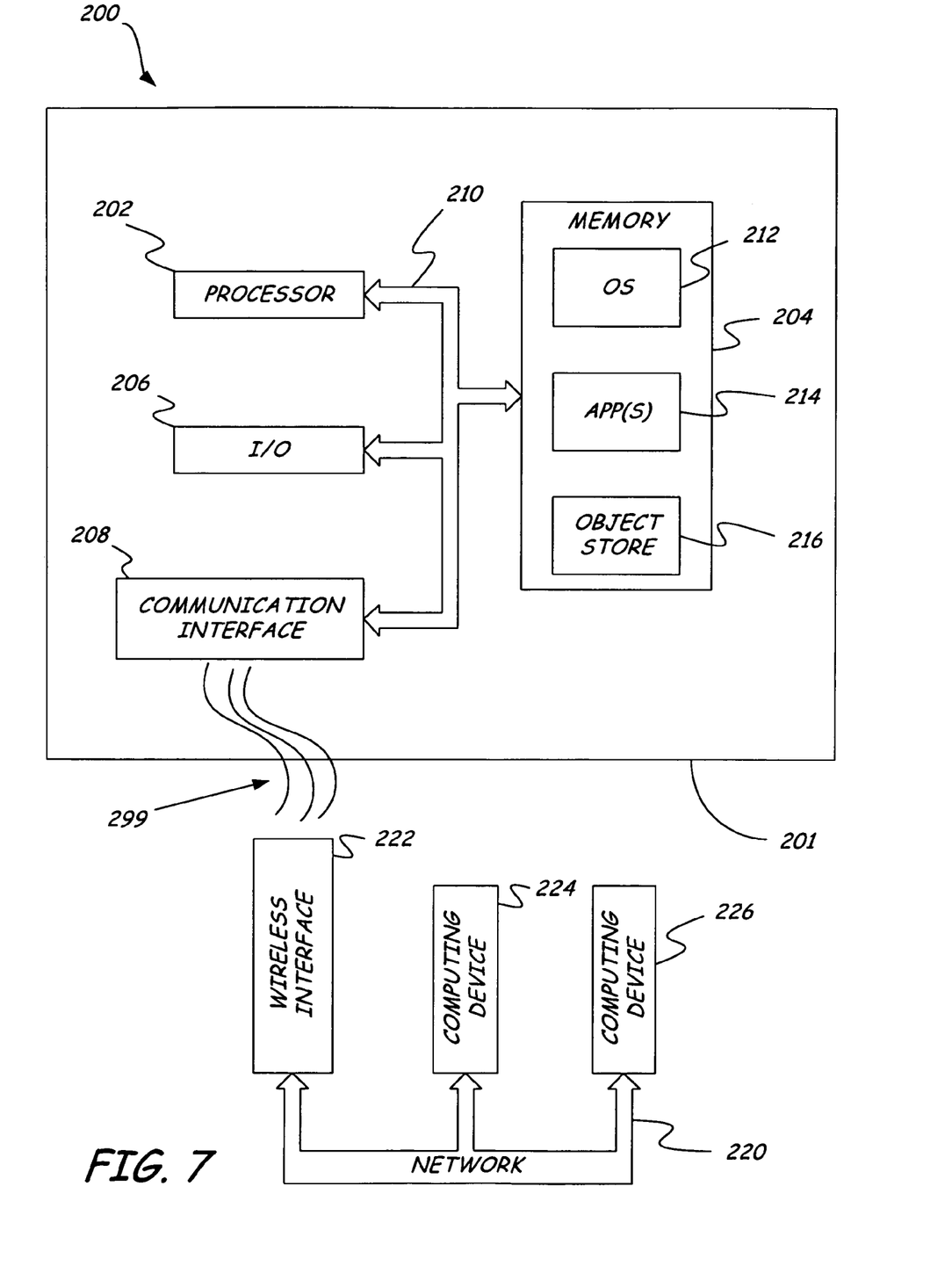
FIG. 7 depicts a block diagram of a general mobile computing environment, according to one illustrative embodiment.

FIG. 7 depicts a block diagram of a general mobile computing environment, comprising a mobile computing device and a medium, readable by the mobile computing device and comprising executable instructions that are executable by the mobile computing device, according to another illustrative embodiment. FIG. 7 depicts a block diagram of a mobile computing system 200 including mobile device 201, according to an illustrative embodiment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is illustratively allocated as addressable memory for program execution, while another portion of memory 204 is illustratively used for storage, such as to simulate storage on a disk drive.

Memory 204 includes an operating system 212, application programs 214 as well as an object store 216. During operation, operating system 212 is illustratively executed by processor 202 from memory 204. Operating system 212, in one illustrative embodiment, is a WINDOWS® CE brand operating system commercially available from Microsoft Corporation. Operating system 212 is illustratively designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Mobile computing system 200 also includes network 220. Mobile computing device 201 is illustratively in wireless communication with network 220—which may for example be the Internet, or some scale of area network—by sending and receiving electromagnetic signals 299 of a suitable protocol between communication interface 208 and wireless interface 222. Wireless interface 222 may be a wireless hub or cellular antenna, for example, or any other signal interface. Wireless interface 222 in turn provides access via network 220 to a wide array of additional computing resources, illustratively represented by computing resources 224 and 226.

Computing device 201 is enabled to make use of executable instructions stored on the media of memory component 204, such as executable instructions that enable computing device 201 to compare indicators of distinctive stylometry in a document with corresponding indicators of distinctive stylometry in a stylometric reference, and provide one or more alterations to the document that alter the indicators of distinctive stylometry compared to the stylometric reference, according to various embodiments. For example, the executable instructions may enable mobile computing device 201 to evaluate linguistic features in a document compared with a reference corpus; determine one or more of the linguistic features in the document that are stylometrically distinctive relative to the reference corpus; and modify one or more of the linguistic features in the document to make them less stylometrically distinctive relative to the reference corpus, according to one illustrative embodiment.

A system such as architecture 20 of FIG. 7, for evaluating linguistic features in a document compared with a reference corpus, determining one or more of the linguistic features in the document that are stylometrically distinctive relative to the reference corpus, and modifying one or more of the linguistic features in the document to make them less stylometrically distinctive relative to the reference corpus, may be embodied as executable instructions stored on a medium, in one illustrative embodiment. Such executable instructions may be stored on a medium readable by a computing device, such as those embodied in FIGS. 6 and 7 as ROM 131, operating system 134, application programs 135, other program modules 136, program data 137, user input interface 160, remote application programs 185, operating system 212, applications 214, or object store 216, for example. Such executable instructions may be readable by a computing device, wherein the executable instructions enable a computing device to carry out the functions indicated for architecture 20 in FIG. 7, or to perform the method 10 of FIG. 6, or to provide the user interfaces depicted in FIGS. 3-5, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implementable at least in part by a computing device, the method comprising:

measuring a value of one or more indicators of stylometry in a stylometric reference;

measuring a value of one or more indicators of distinctive stylometry in a document that correspond to the indicators of stylometry in the stylometric reference;

comparing, using one or more processors of the computing device, the indicators of distinctive stylometry in the document with the corresponding indicators of stylometry in the stylometric reference, in which comparing comprises, for each of the indicators of stylometry in the stylometric reference and the corresponding indicators of distinctive stylometry in the document, ranking the indicators of distinctive stylometry in an order from highest to lowest difference in a value of distinctive stylometry between the stylometric reference and the document;

providing, using one or more of the processors of the computing device, one or more alterations to the document to replace one or more of the indicators of distinctive stylometry in the document with one or more of the corresponding indicators of stylometry in the stylometric reference, following the ranking, beginning with the indicators of distinctive stylometry with the highest values of distinctive stylometry between the stylometric reference and the document, thereby reducing the distinctiveness of the indicators of distinctive stylometry in the document compared to the stylometric reference and increasing the anonymity of the document; and measuring a total remaining stylometric distinctiveness between the document and the stylometric reference after each alteration of one of the indicators of distinctive stylometry in the document with one of the indicators of stylometry in the stylometric reference.

2. The method of claim 1, wherein altering the indicators of distinctive stylometry comprises mimicking stylometric indicators in the stylometric reference.

3. The method of claim 2, wherein the stylometric reference is an anonymized corpus.

4. The method of claim 2, wherein the stylometric reference is a sample of writing by a target author or a set of references corresponding to a set of target authors.

5. The method of claim 1, wherein the alterations are provided automatically.

6. The method of claim 1, wherein the alterations are provided as options selectable by a user.

7. The method of claim 6, further comprising:

providing the total stylometric distinctiveness measured between the document and the stylometric reference after each of the alterations;

wherein the options selectable by the user are provided after each of the alterations, and further comprise an option to finish altering the indicators of distinctive stylometry in the document.

8. The method of claim 1, wherein the alterations are provided automatically, and the alterations are automatically finished once the total stylometric distinctiveness measured for the document reaches a pre-selected threshold.

9. The method of claim 1, wherein comparing the indicators of distinctive stylometry comprises measuring values of selected features in the document, and comparing the values of the selected features with values of the selected features in a stylometric reference.

10. The method of claim 9, wherein comparing the values of the selected features with the values of the selected features in the stylometric reference comprises:

determining whether each of one or more of the selected features is above or below a threshold value determined from the stylometric reference; and determining by what percentage each of the selected features is above or below the threshold value determined from the stylometric reference.

11. The method of claim 9, wherein the selected features comprise words.

12. The method of claim 9, wherein the selected features comprise at least one measurable linguistic feature selected from a group consisting of tokens, function words, function word distances, letter metrics, feature length metrics, part-of-speech trigrams, parse tree segments, logical forms, lexical N-gram features, morphological inflections, honorific suffixes, minority dialect features, minority spellings, spelling errors, and grammar errors.

13. The method of claim 9, wherein measuring values of selected features comprises measuring a frequency of vocabulary originating from a lingua franca register compared with a frequency of vocabulary originating from a vernacular register.

14. The method of claim 1, further comprising:

ranking the indicators of distinctive stylometry in an order of distinctiveness;

removing the indicators of distinctive stylometry that have been subject to the alterations from the document, along with the corresponding indicators of stylometry from the stylometric reference, in order of the ranking, from highest distinctiveness to lower distinctiveness; and measuring a rate at which a total stylometric distinctiveness between the document and the stylometric reference changes, as the indicators are removed.

15. A computing system comprising one or more processors and one or more data storage components, the computing system being configured for:

measuring a value of one or more stylometrically distinctive linguistic features in a target corpus;

measuring a value of one or more corresponding stylometrically distinctive linguistic features in an input document;

comparing, using one or more of the processors, the value of the stylometrically distinctive linguistic features in the target corpus with the value of the corresponding stylometrically distinctive linguistic features in the input document in which comparing comprises, for each of the stylometrically distinctive linguistic features in the target corpus and the corresponding stylometrically distinctive linguistic features in the input document, ranking the stylometrically distinctive linguistic features in order of greater to lesser difference in the value between the target corpus and the input document;

replacing, using one or more of the processors, one or more of the stylometrically distinctive linguistic features in the input document with one or more of the stylometrically distinctive linguistic features in the target corpus, following the ranked order, beginning with the stylometrically distinctive linguistic features ranked with greater difference in the value, thereby reducing the stylometrically distinctive linguistic features in the input document and increasing the anonymity of the input document; and gauging a total remaining stylometric distinctiveness between the input document and the target corpus after each replacing of one of the stylometrically distinctive linguistic features in the input document with one of the stylometrically distinctive linguistic features in the target corpus.

16. A computer readable storage medium storing executable instructions that, when executed by the computer, cause the computer to perform a method comprising:

evaluating, using a processor of the computer, linguistic features indicative of distinctive stylometry in a document compared with corresponding linguistic features indicative of stylometry in a reference corpus, in which the reference corpus comprises an anonymized corpus of stylometric references;

determining one or more of the linguistic features in the document that are stylometrically distinctive relative to the reference corpus, and a value of stylometric distinctiveness of the features relative to the reference corpus;

ranking the stylometrically distinctive features in an order of their values of stylometric distinctiveness;

modifying one or more of the linguistic features in the document, in an order of the ranking beginning with the features having the highest value of stylometric distinctiveness, to make the linguistic features in the document less stylometrically distinctive relative to the reference corpus and increase the anonymity of the document, in which modifying comprises altering one or more linguistic features in the document to mimick stylometric indicators in the stylometric references of the anonymized corpus; and after modifying, determining an updated gauge of total stylometric distinctiveness of the document and modifying one or more additional linguistic features in the document if the gauge of total stylometric distinctiveness of the document is above a pre-selected threshold.

* * * * *